(12) United States Patent
Reinhold

(10) Patent No.: US 7,123,441 B1
(45) Date of Patent: Oct. 17, 2006

(54) ELECTRIC MOTOR HAVING FOIL-SHAPED SUBSTRATE WITH TRACKS WITH VARYING WIDTH

(75) Inventor: Elferich Reinhold, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1187 days.

(21) Appl. No.: 09/618,181

(22) Filed: Jul. 18, 2000

(30) Foreign Application Priority Data

Jul. 20, 1999 (DE) ............................... 199 33 368
Apr. 25, 2000 (EP) ............................... 00201477

(51) Int. Cl.
*G11B 17/02* (2006.01)

(52) U.S. Cl. ..................................... 360/99.08
(58) Field of Classification Search ............. 360/99.08, 360/99.04, 98.07; 310/268
See application file for complete search history.

(56) References Cited

U.S. PATENT DOCUMENTS

| | | | | |
|---|---|---|---|---|
| 4,340,833 A | * | 7/1982 | Sudo et al. | 310/268 |
| 4,677,332 A | * | 6/1987 | Heyraud | 310/268 |
| 4,794,293 A | | 12/1988 | Fuijsaki et al. | 310/268 |
| 5,644,183 A | | 7/1997 | Van Loenen et al. | 310/268 |
| 5,892,307 A | * | 4/1999 | Pavovich et al. | 310/268 |
| 6,040,650 A | * | 3/2000 | Rao | 310/268 |

FOREIGN PATENT DOCUMENTS

| | | |
|---|---|---|
| EP | 0764357 B1 | 3/1997 |
| JP | 04042744 | 2/1992 |

* cited by examiner

*Primary Examiner*—Robert S. Tupper
(74) *Attorney, Agent, or Firm*—Michael E. Belk

(57) ABSTRACT

An electric motor (19) comprises a first part (21) and a second part (23) which are moveable with respect to each other. The first part comprises a foil-shaped insulating substrate (51) on which a plurality of series-connected spiral-shaped patterns (67, 67', 69, 69', 71, 71') of conductor tracks are provided. The second part comprises a permanent magnet unit (73) for generating a magnetic field at the location of the conductor tracks. Said patterns each comprise two main sections (79, 81) with substantially straight, parallel conductor tracks (83, 85) having first ends (89, 93) and second ends (91, 95), and two intermediate sections (97, 99) with curved conductor tracks (101, 103) which respectively mutually connect the first ends of the two main sections and mutually connect the second ends of the two main sections. Said intermediate sections each have a center area (105, 107) respectively halfway between the first ends of the two main sections and halfway between the second ends of the two main sections. According to the invention, each of the conductor tracks of the intermediate sections has a width (w, w') which, seen from the first ends of each main section and from the second ends of each main section, respectively, to the center area of the intermediate section, initially increases and subsequently decreases. As a result, a motor stiffness of the electric motor is considerably increased, so that the motor speed is less affected during operation by external mechanical loads exerted on the motor.

6 Claims, 5 Drawing Sheets

ELECTRIC MOTOR HAVING FOIL-SHAPED SUBSTRATE WITH TRACKS WITH VARYING WIDTH

BACKGROUND OF THE INVENTION

The invention relates to an electric motor comprising a first part and a second part which are movable with respect to each other, wherein the first part comprises a foil-shaped insulating substrate on which a plurality of series-connected spiral-shaped patterns of conductor tracks are provided, each pattern comprising two main sections with substantially straight and parallel conductor tracks having first and second ends and two intermediate sections with conductor tracks which respectively mutually connect the first ends of the two main sections and mutually connect the second ends of the two main sections, said intermediate sections having a center area halfway between the first ends of the two main sections and halfway between the second ends of the two main sections, respectively, and wherein the second part comprises a permanent magnet unit for generating a magnetic field at the location of the conductor tracks.

The invention also relates to a data storage unit comprising a support for at least one information carrier, an electric motor for rotating the support about an axis of rotation, and a scanning unit for scanning the information carrier.

A data storage unit and an electric motor of the kinds mentioned in the opening paragraphs are known from EP-B-0 764 357. The known data storage unit is a hard disc drive, wherein a plurality of hard discs are arranged in mutually parallel positions on the rotatable support. The known electric motor, which is used to rotate the support about the axis of rotation, comprises a circular-cylindrical stator body comprising three layers of the foil-shaped insulating substrate. The patterns of conductor tracks form a three-phase electric coil system, wherein each layer of the stator body comprises one of the respective phases. The conductor tracks constitute relatively thin copper tracks, which are provided on the substrate by means of an etch process. The known electric motor further comprises a circular-cylindrical rotor body, which is fastened to the support and comprises a circular-cylindrical permanent magnet and a circular-cylindrical closing yoke, the stator body being arranged in a circular-cylindrical gap which is present between the magnet and the closing yoke. The intermediate sections of the patterns of conductor tracks of the known motor have substantially straight, parallel conductor tracks which extend perpendicularly to the conductor tracks of the main sections, so that the patterns of conductor tracks have a rectangular shape. The conductor tracks of the main and intermediate sections further have identical, constant widths.

A disadvantage of the known data storage unit and the known electric motor used therein is that, when a predetermined constant electric voltage is supplied to the coil system of the motor, the rotational speed of the motor strongly decreases when the external mechanical torque exerted on the motor about the axis of rotation increases. As a result, the voltage supplied to the motor must be strongly increased to maintain a predetermined speed of the motor at an increased value of the external torque.

SUMMARY OF THE INVENTION

It is an object of the invention to provide an electric motor and a data storage unit of the kinds mentioned in the opening paragraphs, in which the speed of the motor is less affected as a result of an increasing external mechanical load exerted on the motor.

To achieve this object, an electric motor in accordance with the invention is characterized in that the conductor tracks of the intermediate sections are curved, and each of the conductor tracks of the intermediate sections has a width which, seen from the first ends of each main section and from the second ends of each main section, respectively, to the center area of the intermediate section, initially increases and subsequently decreases.

To achieve this object, a data storage unit in accordance with the invention is characterized in that the electric motor used therein is an electric motor in accordance with the invention.

The rate of decrease of the motor speed, which occurs as a result of a predetermined increase of the external mechanical load exerted on the motor at a predetermined value of the electric voltage supplied to the motor, is inversely proportional to the motor stiffness, which is substantially proportional to the ratio $k^2/R$, wherein k represents the force or torque constant of the motor and R represents the electrical resistance of the motor. It was found that a relatively strong increase of the motor stiffness is achieved if the width of the curved conductor tracks of the intermediate sections of the coil patterns initially increases and subsequently decreases, seen from the first ends of each main section and from the second ends of each main section to the center area of the intermediate sections. As a result of said increased motor stiffness, the rate of decrease of the motor speed occurring as a result of a predetermined increase of the external mechanical load on the motor is limited, so that the motor speed is less affected by an increasing external mechanical load.

A particular embodiment of an electric motor in accordance with the invention is characterized in that the conductor tracks of the intermediate sections have a maximum width at a location substantially halfway between the first ends of each main section and the center area of the intermediate section and substantially halfway between the second ends of each main section and the center area of the intermediate section, respectively. As a result of said location of the maximum width of the conductor tracks of the intermediate sections, an optimum increase of the motor stiffness is achieved.

A further embodiment of an electric motor in accordance with the invention is characterized in that the conductor tracks of the main sections have a width which decreases in a direction from an inner one of the conductor tracks to an outer one of the conductor tracks. As a result of the fact that the width of the conductor tracks of the main sections of the patterns decreases in a direction from the inner one to the outer one of the conductor tracks, the motor stiffness is further increased.

Yet another embodiment of an electric motor in accordance with the invention is characterized in that the first part and the second part are rotatable with respect to each other about an axis of rotation, the substrate being bent as a circular-cylindrical body which is arranged concentrically relative to the axis of rotation. In this embodiment, the electric motor is a rotary motor in which the rotational speed of the motor is affected only to a limited degree by an increase of the external mechanical torque exerted on the motor about the axis of rotation.

A particular embodiment of an electric motor in accordance with the invention is characterized in that the first part and the second part are moveable with respect to each other in a linear direction, the substrate being arranged in an imaginary plane extending parallel to said linear direction.

In this particular embodiment, the electric motor is a linear motor in which the linear speed of the motor is affected only to a limited degree by an increase of the external mechanical force exerted on the motor in the linear direction.

BRIEF DESCRIPTION OF THE DRAWING

Embodiments of the invention will be explained in more detail below with reference to the drawing, in which.

DESCRIPTION OF THE PREFERRED EMBODIMENTS

Figure 1:
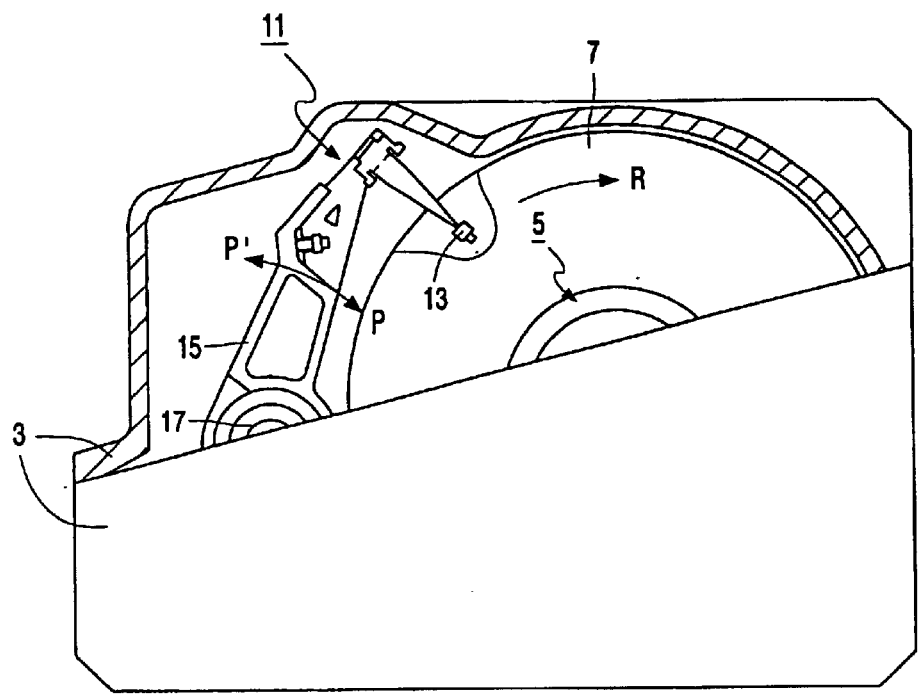
FIG. 1 is a diagrammatic plan view of a data storage unit in accordance with the invention provided with an electric motor in accordance with the invention.
Figure 2:
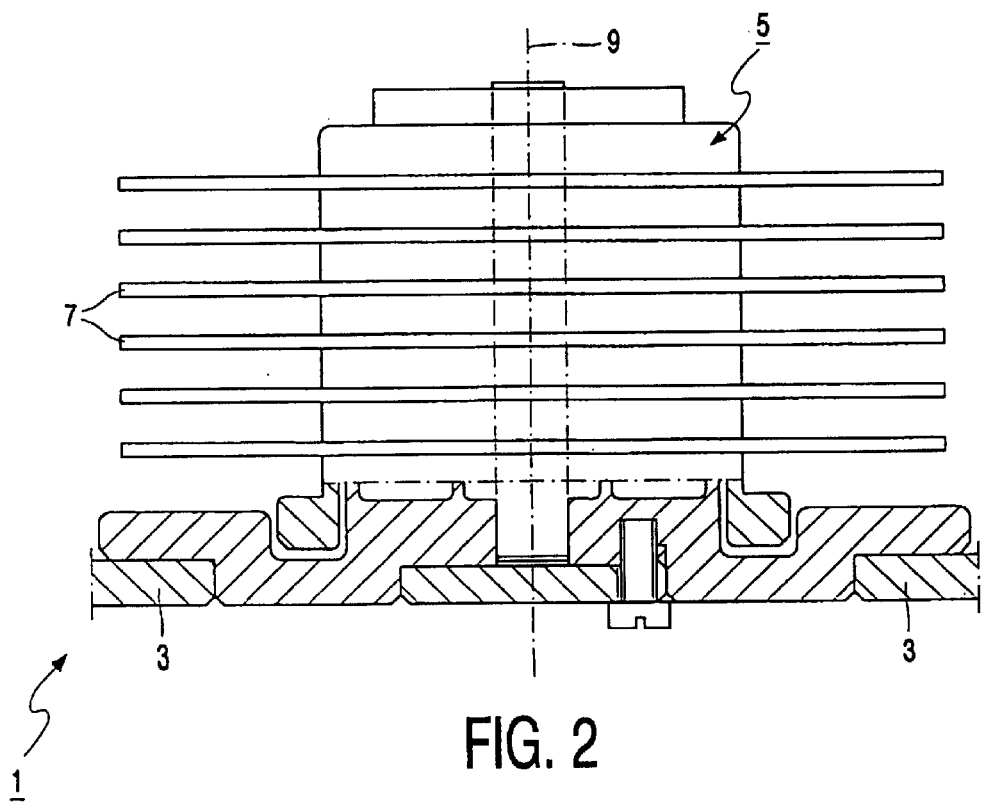
FIG. 2 is a side elevation of the data storage unit of FIG. 1.

A data storage unit 1 in accordance with the invention shown in FIGS. 1 and 2 comprises a housing 3 accommodating a support 5 for a number of information carriers 7. The support 5 is rotatable about an axis of rotation 9. The information carriers 7 are magnetic hard discs which are arranged around the support 5 in mutually parallel positions perpendicular to the axis of rotation 9. The housing 3 further accommodates a scanning unit 11 comprising a number of magnetic heads 13 which are mounted on an arm 15 which is pivotable about a pivot axis 17 extending parallel to the axis of rotation 9. The scanning unit 11 comprises a separate magnetic head 13 for each information carrier 7, only one of the magnetic heads 13 being visible in FIG. 1. The information carriers 7 are read or written by the magnetic heads 13 in that the support 5 carrying the information carriers 7 is rotated about the axis of rotation 9 in a rotational direction R and the magnetic heads 13 are positioned with respect to the rotating information carriers 7 by pivoting the arm 15 in pivotal directions P and P'.

Figure 3:
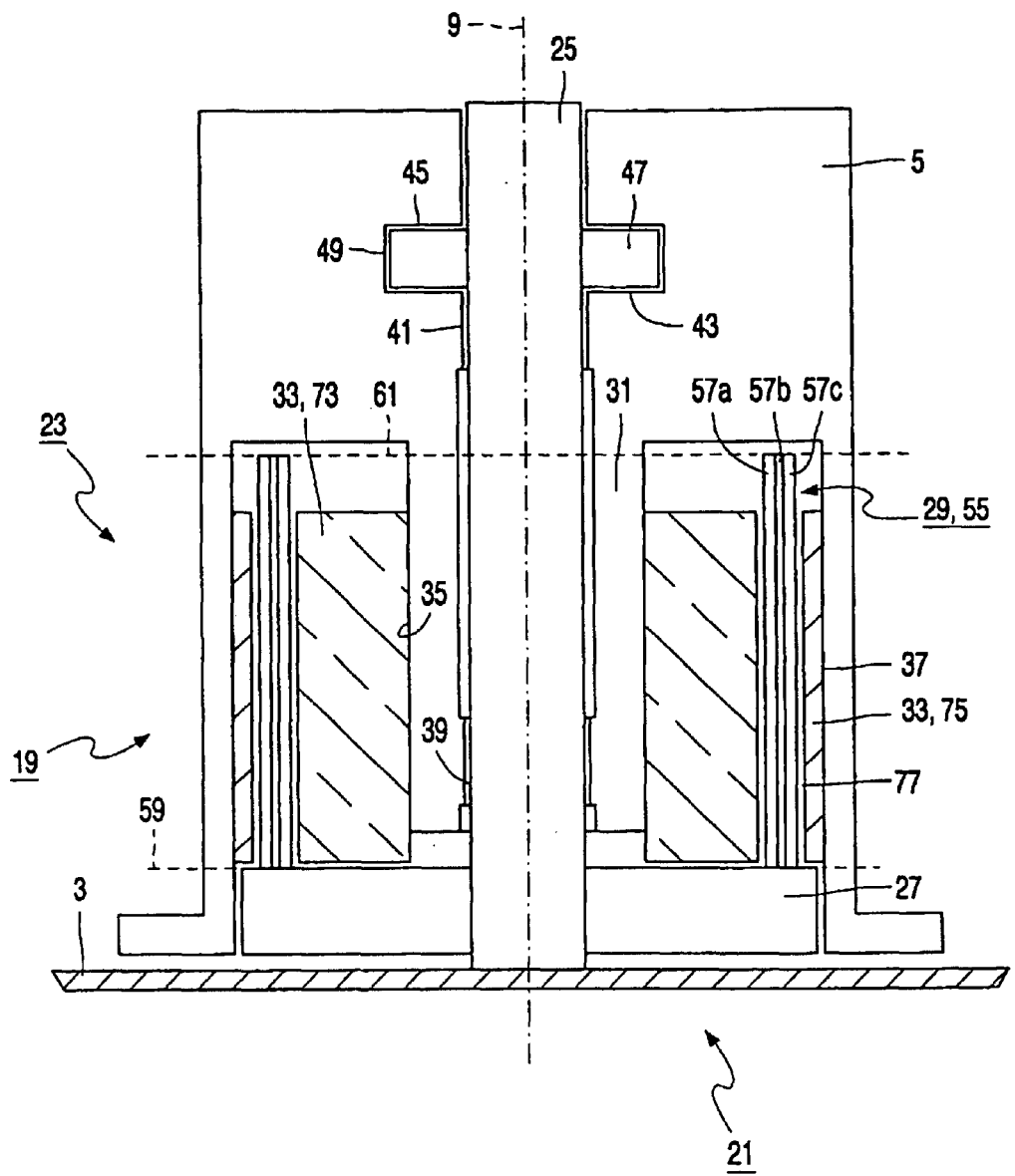
FIG. 3 is a diagrammatic cross-section of an electric motor in accordance with the invention used in the data storage unit of FIG. 1, FIG. 4 diagrammatically shows a foil-shaped insulating substrate supporting a coil system of the electric motor of FIG. 3.

The support 5 of the data storage unit 1 is rotatable about the axis of rotation 9 by means of an electric motor 19 in accordance with the invention, which is diagrammatically shown in FIG. 3. The motor 19 comprises a first part 21, which is mounted in a fixed position relative to the housing 3 of the data storage unit 1, and a second part 23, which is rotatable with respect to the first part 21 about the axis of rotation 9 and to which the support 5 of the data storage unit 1 is mounted. The first part 21 of the motor 19 comprises a central shaft 25, which has a central axis coinciding with the axis of rotation 9 and which is mounted to the housing 3, an annular carrier 27, which is mounted to the shaft 25 and extends perpendicularly to the axis of rotation 9, and a circular-cylindrical stator body 29, which is mounted to the carrier 27 and is concentric relative to the axis of rotation 9. The second part 23 of the motor 19 comprises a sleeve 31, which is concentric relative to the axis of rotation 9, and a circular-cylindrical rotor body 33, which is also concentric relative to the axis of rotation 9 and is partially mounted on an outer wall 35 of the sleeve 31 and partially on an inner wall 37 of the support 5. The first part 21 and the second part 23 of the motor 19 are journalled relative to each other by means of two radial dynamic groove bearings 39 and 41, which are arranged at a distance from each other, seen in a direction parallel to the axis of rotation 9, and which are provided on the central shaft 25 and on the sleeve 31, and by means of two axial dynamic groove bearings 43 and 45, which are provided on an annular thrust plate 47 mounted to the central shaft 25 and on an annular recess 49 provided in the sleeve 31. The groove bearings 39, 41, 43, 45 are of a kind which is generally known.

Figure 4:
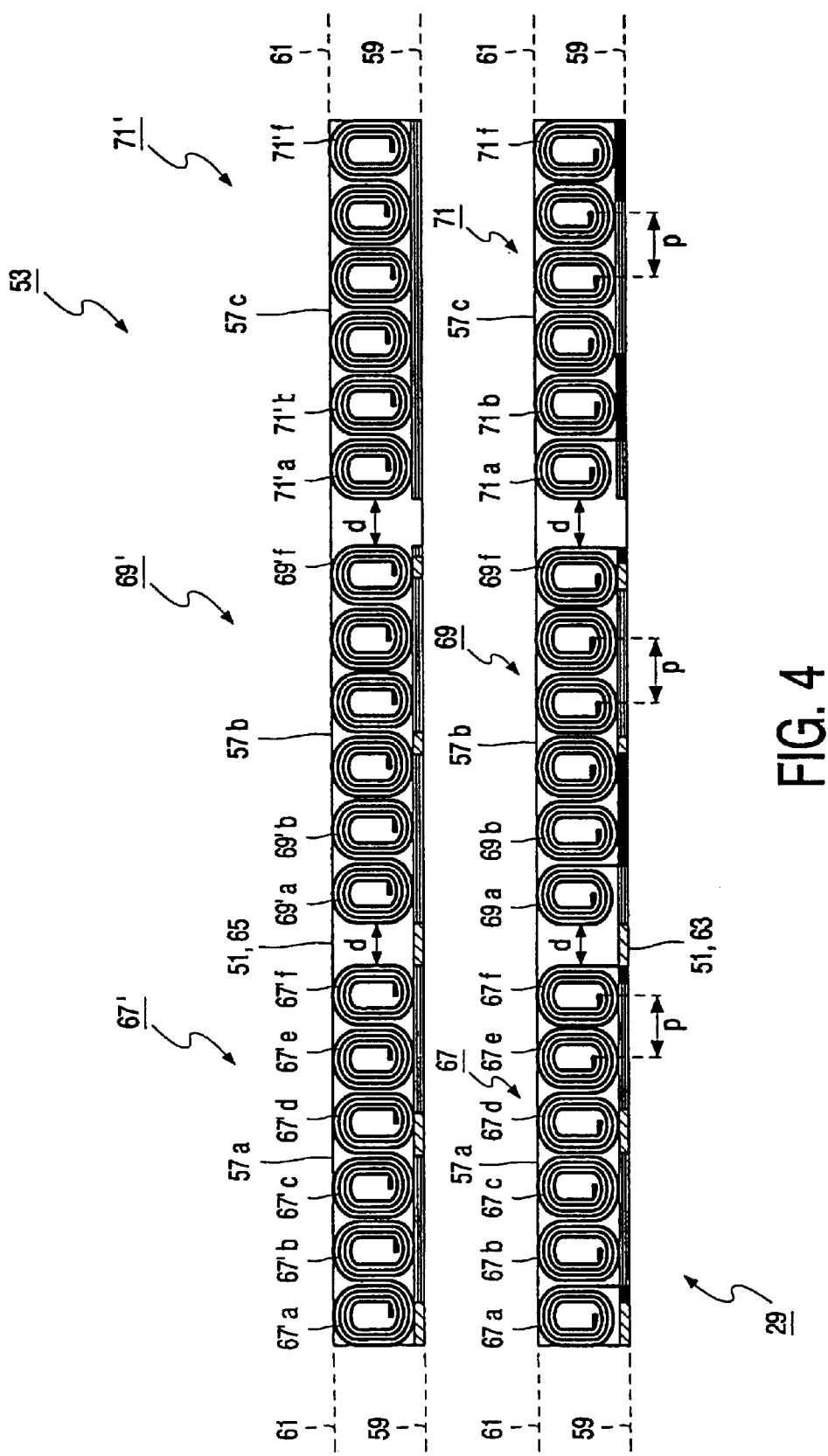

The circular-cylindrical stator body 29 comprises a foil-shaped insulating substrate 51 on which a three-phase electric coil system 53 is provided. The substrate 51 is bent or rolled up so as to form a circular-cylindrical body 55 comprising three layers 57a, 57b, 57c of the substrate 51 and extending, seen in a direction parallel to the axis of rotation 9, between a first imaginary end surface 59 and a second imaginary end surface 61 both extending perpendicularly to the axis of rotation 9, said body 55 being mounted on the carrier 27 near said first end surface 59. The insulating substrate 51 comprising the coil system 53 is shown in an unrolled condition in FIG. 4. The substrate 51 comprises a first side 63 facing the axis of rotation 9 in a rolled-up condition and a second side 65 which is remote from the axis of rotation 9 and which is in a rolled-up condition. On both sides 63, 65 of the substrate 51, three groups of series-connected spiral-shaped patterns of copper conductor tracks are provided on the substrate 51 by means of an etch process. In the embodiment shown, the first or inner layer 57a of the substrate 51 comprises a first group 67 of patterns 67a–67f on the first side 63 and a second group 67' of patterns 67'a–67'f on the second side 65, wherein the pattern 67a is electrically connected to the pattern 67'a, the pattern 67'a is electrically connected to the pattern 67'b, the pattern 67'b is electrically connected to the pattern 67b, etc. Thus, the patterns 67a–67f and 67'a–67'f are series-connected and form a first phase of the three-phase coil system 53. Likewise, the second or middle layer 57b of the substrate 51 comprises a third group 69 of patterns 69a–69f on the first side 63 and a fourth group 69' of patterns 69'a–69'f on the second side 65, wherein the pattern 69a is electrically connected to the pattern 69'a, the pattern 69'a is electrically connected to the pattern 69'b, the pattern 69'b is electrically connected to the pattern 69b, etc. Thus, the patterns 69a–69f and 69'a–69'f are series-connected and form a second phase of the three-phase coil system 53. Finally, the third or outer layer 57c of the substrate 51 comprises a fifth group 71 of patterns 71a–71f on the first side 63 and a sixth group 71' of patterns 71'a–71'f on the second side 65, wherein the pattern 71a is electrically connected to the pattern 71'a, the pattern 71'a is electrically connected to the pattern 71'b, the pattern 71'b is electrically connected to the pattern 71b, etc. Thus, the patterns 71a–71f and 71'a–71'f are series-connected and form a third phase of the three-phase coil system 53. Between the first, the third and the fifth group 67, 69, 71 and between the second, the fourth, and the sixth group 67', 69', 71', a distance d is present on the substrate 51 which is approximately equal to $2/3$ times the pitch p between the individual patterns of the groups 67, 67', 69, 69', 71, 71'. The first, the second, and the third phase of the coil system 53 are electrically connected to the respective three phases and to a ground contact of an electrical energy source, not shown in the Figs., by means of a connector means also not shown in the Figs. As shown in FIG. 3, the circular-cylindrical rotor body 33 comprises a circular-cylindrical magnet body 73 which is mounted on the outer wall 35 of the sleeve 31 and which comprises a number of magnetic poles which successively have opposite radial directions of magnetization, the number of magnetic poles being adapted to the number of patterns of an individual group 67, 67', 69, 69', 71, 71'. The rotor body 33 further comprises a circular-cylindrical closing yoke 75 which is mounted on the inner wall 37 of the support 5. Between the magnet body 73 and the closing yoke 75, a circular-cylindrical gap 77 is present in which the stator body 29 is accommodated, so that the magnet body 73 generates a magnetic field at the location of the conductor tracks on the substrate 51.

Figure 5:
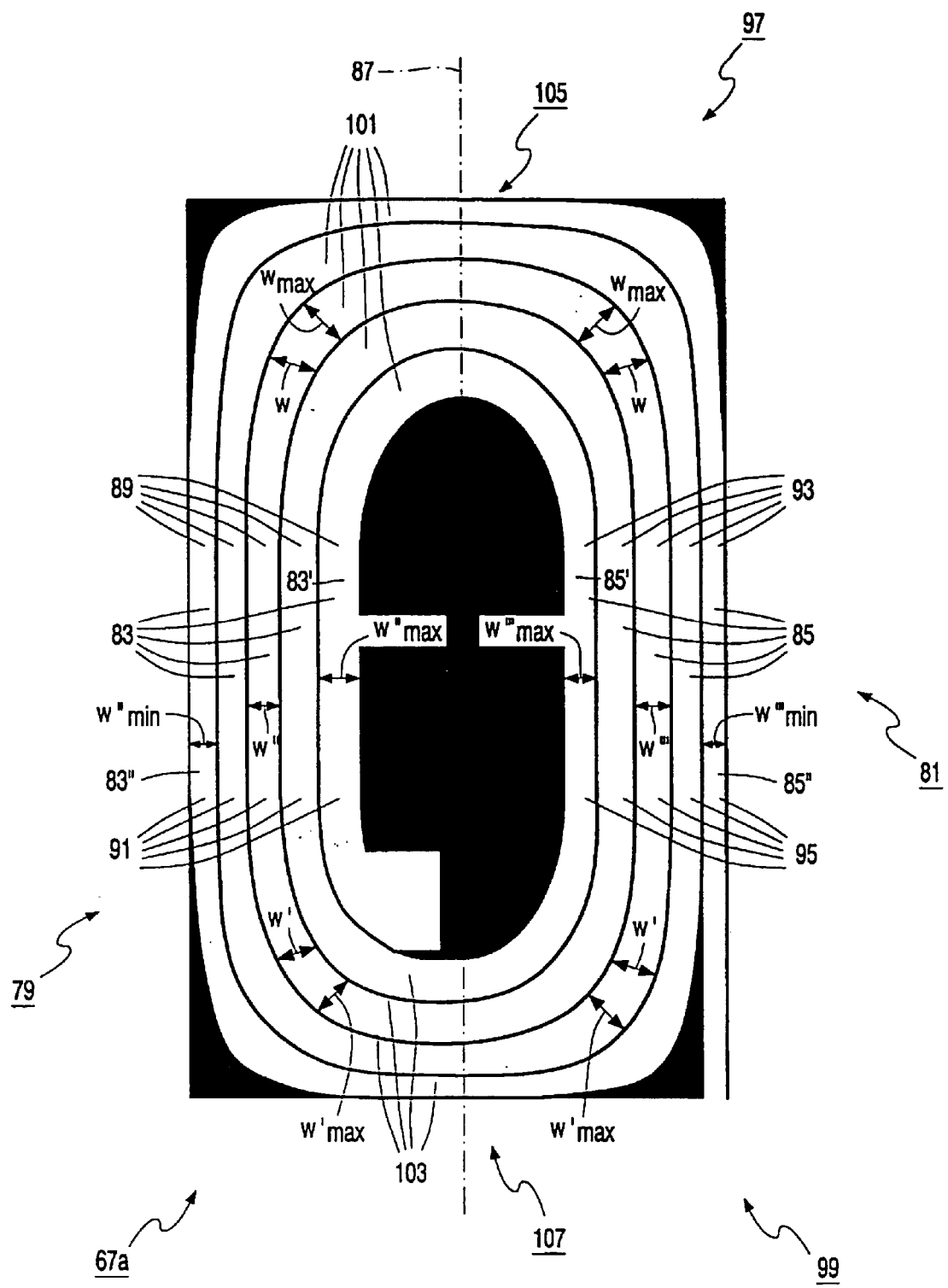
FIG. 5 shows a spiral-shaped pattern of conductor tracks of the substrate of FIG. 4.

FIG. 5 shows one of the spiral-shaped patterns 67a of conductor tracks on the substrate 51 in detail. The other patterns of conductor tracks on the substrate 51 have a substantially identical shape. As FIG. 5 shows, the pattern 67a comprises two main sections 79 and 81 with substantially straight conductor tracks 83, 85, which extend substantially parallel to a central line 87 of the pattern 67a. The conductor tracks 83 of the main section 79 each extend from a first end 89 to a second end 91, and the conductor tracks 85 of the main section 81 each extend from a first end 93 to a second end 95. The pattern 67a further comprises two intermediate sections 97 and 99 with curved conductor tracks 101, 103. The conductor tracks 101 of the intermediate section 97 connect the first ends 89 of the conductor tracks 83 of the main section 79 with the first ends 93 of the conductor tracks 85 of the main section 81, and the conductor tracks 103 of the intermediate section 99 connect the second ends 91 of the conductor tracks 83 of the main section 79 with the second ends 95 of the conductor tracks 85 of the main section 81. The intermediate section 97 has a center area 105 halfway between the first ends 89 of the conductor tracks 83 of the main section 79 and the first ends 93 of the conductor tracks 85 of the main section 81, and the intermediate section 99 has a center area 107 halfway between the second ends 91 of the conductor tracks 83 of the main section 79 and the second ends 95 of the conductor tracks 85 of the main section 81. The pattern 67a further has an end portion 109, via which the pattern 67a is electrically connected through the substrate 51 to the pattern 67'a on the second side 65 of the substrate 51.

Figure 6:
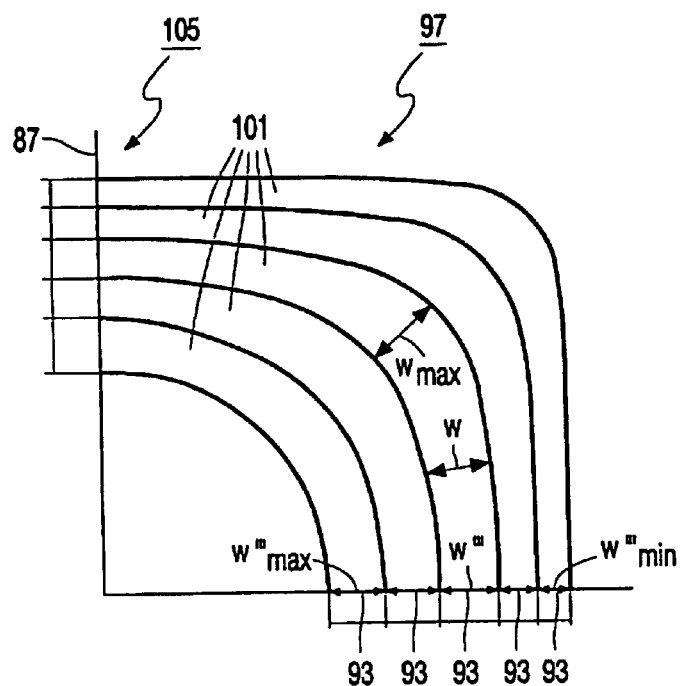
FIG. 6 shows one half of an intermediate section of the pattern of FIG. 5.

FIG. 6 shows one half of the intermediate section 97 of the pattern 67a. As FIG. 6 shows, each of the conductor tracks 101 of the intermediate section 97 has a width w which, seen from the first ends 93 of the conductor tracks 85 of the main section 81 to the center area 105 of the intermediate section 97, initially increases and subsequently decreases. Likewise, as is visible in FIG. 5 only, the width w of the conductor tracks 101 of the intermediate section 97 initially increases and subsequently decreases, seen from the first ends 89 of the conductor tracks 83 of the main section 79 to the center area 105 of the intermediate section 97. Likewise, as is also visible in FIG. 5 only, each of the conductor tracks 103 of the intermediate section 99 has a width w' which, seen from the second ends 91, 95 of each main section 83, 85, respectively, to the center area 107 of the intermediate section 99, initially increases and subsequently decreases. It was found that, as a result of these changing widths w and w' of the curved conductor tracks 101 and 103, a relatively strong increase of the so-called motor stiffness is achieved. Said motor stiffness is substantially proportional to the ratio $k^2/R$, wherein k represents the torque constant of the motor 19 and R represents the electrical resistance of the motor 19. As a result of said increased motor stiffness, the rate of decrease of the motor speed, which occurs as a result of a predetermined increase of the external mechanical load exerted on the motor 19 at a predetermined value of the electric voltage supplied to the motor 19, is considerably reduced, so that the motor speed is less affected by an increasing external mechanical load. As a result, variations of the rotational speed of the motor 19 are avoided as much as possible during operation, so that the scanning process of the data storage unit 1 is substantially not influenced by variations of the rotational speed of the information carriers 7. As FIGS. 5 and 6 further show, the width w of the conductor tracks 101 of the intermediate section 97 has a maximum value $w_{max}$ at a location substantially halfway between the first ends 89 of the conductor tracks 83 of the main section 79 and the center area 105 of the intermediate section 97 and at a location substantially halfway between the first ends 93 of the conductor tracks 85 of the main section 81 and the center area 105. Likewise, the width w' of the conductor tracks 103 of the intermediate section 99 has a maximum value $w'_{max}$ at a location substantially halfway between the second ends 91 of the conductor tracks 83 of the main section 79 and the center area 107 of the intermediate section 99 and at a location substantially halfway between the second ends 95 of the conductor tracks 85 of the main section 81 and the center area 107. As a result of these locations of the maximum values $w_{max}$ and $w'_{max}$, said increase of the motor stiffness has an optimum value. As FIGS. 5 and 6 further show, the conductor tracks 83 and 85 of the main sections 79 and 81 have a width w'', w''' which decreases in a direction from an inner one 83', 85' of the conductor tracks 83, 85 to an outer one 83'', 85'' of the conductor tracks 83, 85, i.e. the inner conductor tracks 83', 85' have a maximum width $w''_{max}$, $w'''_{max}$, and the outer conductor tracks 83'', 85'' have a minimum width $w''_{min}$, $w'''_{min}$. As a result, the motor stiffness is further increased.

Figure 7:
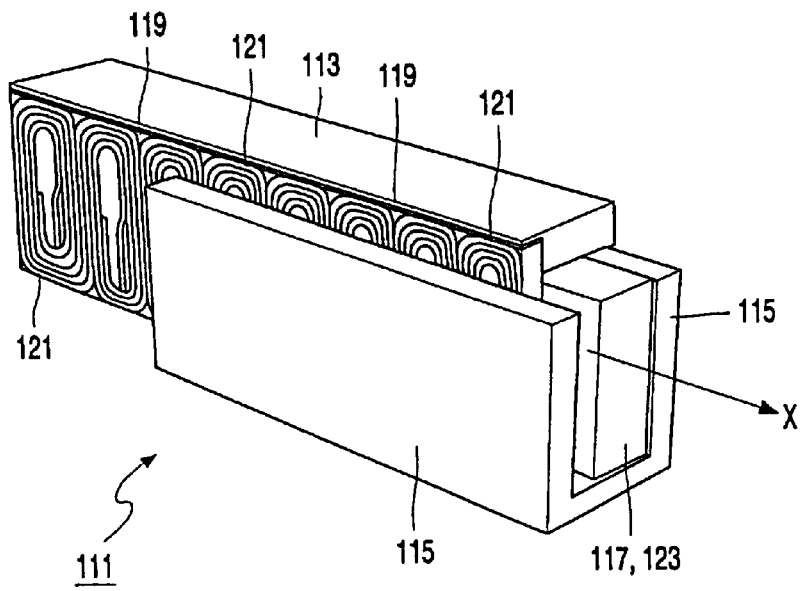
FIG. 7 is a diagrammatic plan view of a further embodiment of an electric motor in accordance with the invention.

FIG. 7 diagrammatically shows a further embodiment of an electric motor 111 in accordance with the invention. The motor 111 is a linear motor and comprises a first part 113, which is mounted in a fixed position relative to a frame 115 of the motor 111, and a second part 117, which is guided relative to the first part 113 and the frame 115 so as to be moveable with respect to the first part 113 in a direction parallel to a linear direction X. The first part 113 comprises a number of layers of a foil-shaped insulating substrate 119, wherein each of said layers comprises a plurality of series-connected spiral-shaped patterns 121 of conductor tracks comparable to the pattern 67a shown in FIG. 5. In the embodiment shown, the first part 113 comprises three layers of the substrate 119, each layer carrying one phase of a three-phase electric coil system. The second part 117 comprises a permanent magnet unit 123 for generating a magnetic field at the location of the conductor tracks. In the electric motor 111, the substrate 119 is arranged in an imaginary plane extending parallel to said linear direction X. As a result of the use of said patterns 121, which are comparable to the pattern 67a of the motor 19 discussed before, the linear motor 111 has a high motor stiffness, seen in a direction parallel to the X-direction, so that the linear speed of the motor 111 in a direction parallel to the X-direction is affected only to a limited degree by an increase of the external mechanical force exerted on the motor 111 in a direction parallel to the X-direction.

The electric motor 19 in accordance with the invention as described before is used in the data storage unit 1 in accordance with the invention as described before. It is noted that an electric motor in accordance with the invention can also be used in other devices wherein a part of the device has to be rotated about an axis of rotation. An electric motor in accordance with the invention can, for example, also be used in a data storage unit for an optical information carrier or in a scanning device comprising a rotatable multifaceted mirror. The electric motor 111 in accordance with the invention as described before can be used, for example, in a data storage unit for moving a scanning unit of the data storage unit in a radial direction with respect to a disc-shaped information carrier to be scanned by the scanning unit. A linear electric motor in accordance with the invention can also be used in other devices wherein a part of the device has to be moved in a linear direction, such as, for example, a positioning device having an object table movable in two mutually perpendicular coordinate-directions.

It is further noted that the invention also covers electric motors in which the first part comprises another number of layers of the foil-shaped insulating substrate. Thus, for example, the first part may also comprise only one or two, or more than three layers of the substrate. In such alternative embodiments, each layer of the substrate may comprise a single electrical phase of the coil system provided on the substrate. However, the invention also covers embodiments in which each single phase of the coil system is provided on more than one layer of the substrate, or in which a layer of the substrate comprises more than one phase of the coil system.

It is finally noted, that the invention also covers embodiments of an electric motor in which the patterns provided on the insulating substrate have a different constitution. Thus, for example, the invention also covers electric motors having patterns of which the conductor tracks of the main sections are much shorter than the conductor tracks 83, 85 of the pattern 67*a* shown in FIG. 5 and discussed before. The invention even covers embodiments in which said main sections of the patterns are small relative to the intermediate sections.

What is claimed is:

1. An electric motor comprising a first part and a second part which are movable with respect to each other, wherein the first part comprises a foil-shaped insulating substrate on which a plurality of series-connected spiral-shaped patterns of conductor tracks are provided, each pattern comprising two main sections with substantially straight and parallel conductor tracks having first and second ends and two intermediate sections with conductor tracks which respectively mutually connect the first ends of the two main sections and mutually connect the second ends of the two main sections, said intermediate sections having a center area halfway between the first ends of the two main sections and halfway between the second ends of the two main sections, respectively, and wherein the second part comprises a permanent magnet unit for generating a magnetic field at the location of the conductor tracks, characterized in that the conductor tracks of the intermediate sections are curved, and each of the conductor tracks of the intermediate sections has a width which, seen from the first ends of each main section and from the second ends of each main section, respectively, to the center area of the intermediate section, initially increases and subsequently decreases.

2. An electric motor as claimed in claim 1, characterized in that the conductor tracks of the intermediate sections have a maximum width at a location substantially halfway between the first ends of each main section and the center area of the intermediate section and substantially halfway between the second ends of each main section and the center area of the intermediate section, respectively.

3. An electric motor as claimed in claim 1, characterized in that the conductor tracks of the main sections have a width which decreases in a direction from an inner one of the conductor tracks to an outer one of the conductor tracks.

4. An electric motor as claimed in claim 1, characterized in that the first part and the second part are rotatable with respect to each other about an axis of rotation, the substrate being bent as a circular-cylindrical body which is arranged concentrically relative to the axis of rotation.

5. An electric motor as claimed in claim 1, characterized in that the first part and the second part are moveable with respect to each other in a linear direction, the substrate being arranged in an imaginary plane extending parallel to said linear direction.

6. A data storage unit comprising a support for at least one information carrier, an electric motor for rotating the support about an axis of rotation, and a scanning unit for scanning the information carrier, characterized in that the electric motor is an electric motor as claimed in claim 4.

* * * * *